US010951344B2

(12) United States Patent
Matsuda et al.

(10) Patent No.: US 10,951,344 B2
(45) Date of Patent: Mar. 16, 2021

(54) OPTICAL TRANSMITTER, OPTICAL RECEIVER, AND OPTICAL TRANSMISSION SYSTEM

(71) Applicant: NIPPON TELEGRAPH AND TELEPHONE CORPORATION, Tokyo (JP)

(72) Inventors: Toshiya Matsuda, Tokyo (JP); Toru Homemoto, Tokyo (JP); Kana Masumoto, Tokyo (JP); Masaru Katayama, Tokyo (JP); Katsutoshi Koda, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 16/626,468

(22) PCT Filed: Jun. 21, 2018

(86) PCT No.: PCT/JP2018/023574
§ 371 (c)(1),
(2) Date: Dec. 24, 2019

(87) PCT Pub. No.: WO2019/004040
PCT Pub. Date: Jan. 3, 2019

(65) Prior Publication Data
US 2020/0127757 A1 Apr. 23, 2020

(30) Foreign Application Priority Data

Jun. 27, 2017 (JP) ................... 2017-124728

(51) Int. Cl.
H04J 14/02 (2006.01)
H04J 14/06 (2006.01)
(Continued)

(52) U.S. Cl.
CPC .......... H04J 14/06 (2013.01); H04B 10/5161 (2013.01); H04B 10/60 (2013.01); H04J 14/02 (2013.01)

(58) Field of Classification Search
CPC ..... H04B 10/60; H04B 10/5161; H04J 14/02; H04J 14/06
See application file for complete search history.

(56) References Cited

U.S. PATENT DOCUMENTS

2010/0021166 A1* 1/2010 Way .................... H04J 14/0256
398/79
2010/0028001 A1 2/2010 Yu et al.
(Continued)

FOREIGN PATENT DOCUMENTS

JP 2010041707 A 2/2010
JP 2010166242 7/2010
WO 2009004682 8/2009

OTHER PUBLICATIONS

A. Hyvarinen, "Independent component analysis: algorithms and applications", Neural Network, vol. 13, No. 4-5, pp. 411-430 Jun. 2000.
(Continued)

Primary Examiner — Dzung D Tran
(74) Attorney, Agent, or Firm — The Marbury Law Group, PLLC

(57) ABSTRACT

An optical transmitter generates two modulated optical signals by modulating two optical carriers respectively with two binary bit sequences by on-off keying and generates an orthogonal polarization multiplexed optical signal from the two modulated optical signals. The two optical carriers respectively have peak frequency components spaced apart from each other by a predetermined frequency difference and located such that a central frequency of a WDM channel of a WDM grid falls between the peak frequency components. An optical receiver separates the orthogonal polarization multiplexed optical signal into two signals in which components of the two modulated optical signals are combined with different combination ratios, by means of a
(Continued)

1-input, 2-output asymmetric filter whose two optical transmittances intersect at the WDM grid and each have a free spectral range equal to or twice the channel spacing of the WDM grid, and restores the two modulated optical signals from the separated two signals using a DSP.

4 Claims, 6 Drawing Sheets

(51) Int. Cl.
    *H04B 10/516*     (2013.01)
    *H04B 10/60*     (2013.01)

(56) References Cited

U.S. PATENT DOCUMENTS

| | | |
|---|---|---|
| 2010/0119230 A1 | 5/2010 | Terada |
| 2010/0196008 A1* | 8/2010 | Szafraniec ........... H04B 10/697 398/65 |
| 2012/0008950 A1 | 1/2012 | Jander et al. |
| 2012/0294616 A1* | 11/2012 | Sasaki ................ H04J 14/0298 398/79 |
| 2019/0072731 A1* | 3/2019 | Yamazaki ............ H04B 10/572 |
| 2019/0326995 A1* | 10/2019 | Zhou ...................... H04B 10/64 |

OTHER PUBLICATIONS

W. Freude et al., "Quality Metrics for Optical Signals: Eye Diagram, Q-factor, OSNR, EVM and BER", Proc. ICTON 2012, Mo.B1.5, (2012).

A. Vigano et al., "Performance Analysis in a PAM-4 Fiber Transmission IM-DD with Pre-compensation Filter", WSEAS Trans. Communications, vol. 15, pp. 317-322, (2016).

E. Oja et al., "The FastICA Algorithm Revisited: Convergence Analysis", IEEE Trans. Neural Networks, vol. 17, No. 6, pp. 1370-1381, Nov. 2006.

International Search Report by ISA/JP dated Sep. 11, 2018, on PCT/JP2018/023574 (EN: 2 pages/JA: 3 pages).

Written Opinion by ISA/JP dated Sep. 11, 2018, on PCT/JP2018/012294 (JA: 4 pages).

\* cited by examiner

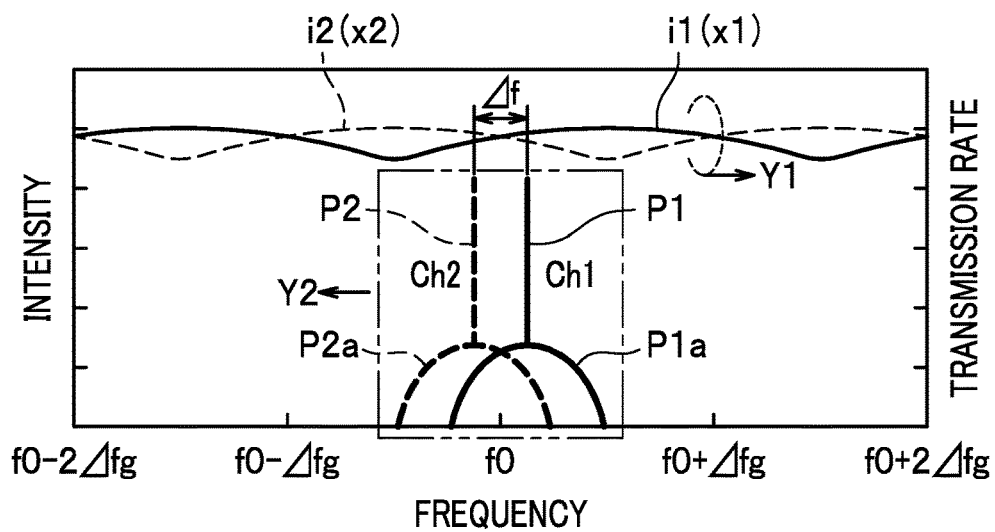
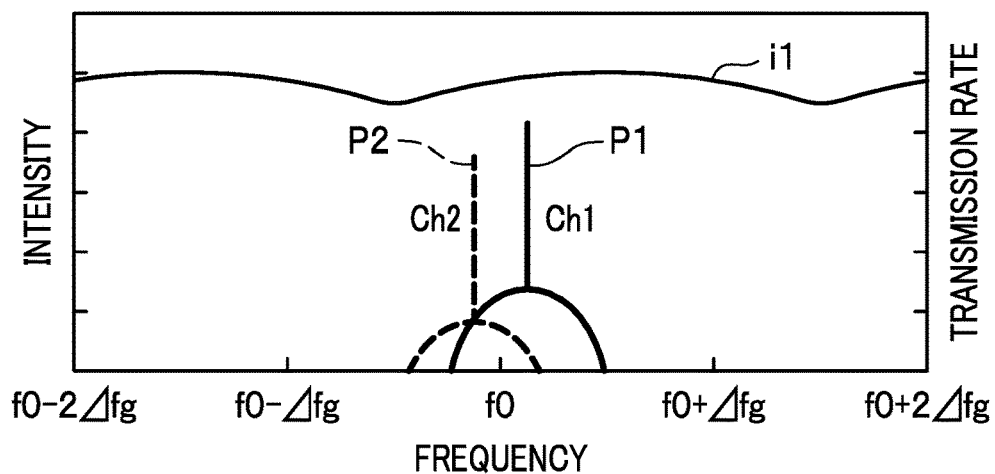
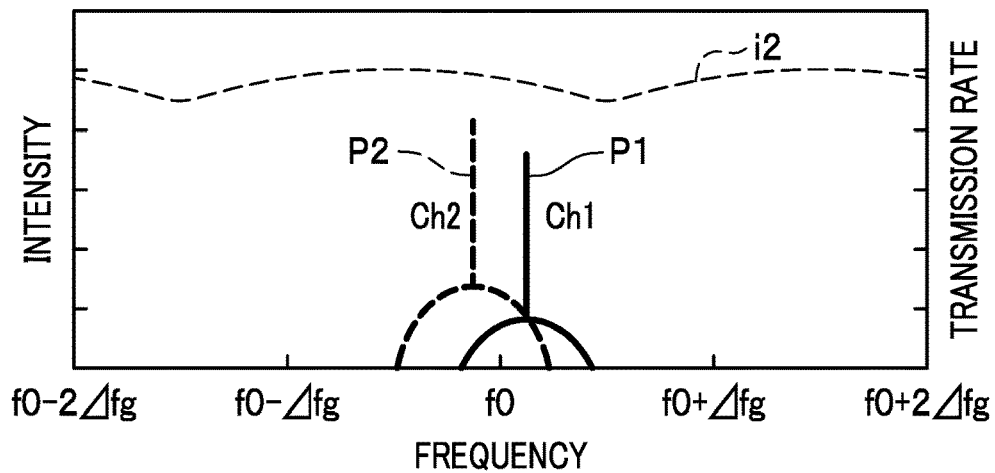

OPTICAL TRANSMITTER, OPTICAL RECEIVER, AND OPTICAL TRANSMISSION SYSTEM

RELATED APPLICATIONS

This application is a national phase entry of international patent application PCT/JP2018/023574 filed Jun. 21, 2018, which claims benefit of priority to Japanese Application Serial No. 2017-124728, filed Jun. 27, 2017, the entire disclosures of which are incorporated herein by reference in their entireties.

TECHNICAL FIELD

The present invention relates to an optical transmitter for transmitting multi-carrier optical signals, an optical receiver for receiving multi-carrier optical signals, and an optical transmission system.

BACKGROUND ART

With the rapid increase in traffic at datacenters, standardization of 100 GbE and development of optical modules for 100 GbE are in progress. The mainstream of the 100 GbE optical modules is composed of different 4 wavelength optical signals×25-Gbit/s intensity-modulation direct-detection (IM-DD) transceivers. Development of small-size and power-saving modules, which may be used as an optical interface of optical transceivers or the like in a datacenter, is in progress. Examples of such a module include Centum gigabit Form factor Pluggable (CFP) 4 and Quad Small Form-factor Pluggable (QSFP) 28.

On the other hand, for the purpose of directly connecting datacenters, development of optical modules for outputting an optical signal for a wavelength division multiplexing (WDM) grid is in progress. For example, small size modules serving as optical transceivers compliant with 10 Gigabit Small Form Factor Pluggable (XFP) or Small Form-Factor Pluggable Plus (SFP+), which are standards for 10G, have begun to be marketed. It is possible to construct a low-cost WDM system by using these optical modules.

PRIOR ART DOCUMENTS

Non-Patent Documents

Non-patent document 1: A. Hyvarinen, "Independent component analysis: algorithms and applications", Neural Network, vol. 13, no. 4-5, pp. 411-430 June (2000).
Non-patent document 2: W. Freude et al., "Quality Metrics for Optical Signals: Eye Diagram, Q-factor, OSNR, EVM and BER", Proc. ICTON 2012, Mo.B1.5, (2012).
Non-patent document 3: A. Vigano et al., "Performance Analysis in a PAM-4 Fiber Transmission IM-DD with Pre-compensation Filter", WSEAS Trans. Communications, vol. 15, pp. 317-322, (2016).
Non-patent document 4: E. Oja et al., "The FastICA Algorithm Revisited: Convergence Analysis", IEEE Trans. Neural Networks, vol. 17, no. 6, pp. 1370-1381, November (2006).

SUMMARY OF THE INVENTION

Problems to be Solved by the Invention

When 100 GbE optical modules and 40 GbE optical modules, which use optical signals of different wavelengths as described above, are applied to a WDM system, it is necessary to implement a large-scale wavelength tunable function in an optical demultiplexer in the optical modules, which has been an obstacle to reducing the optical modules in size.

To realize a large-capacity wavelength-tunable optical interface without the aid of wavelength division multiplexing, a method using Pulse-Amplitude Modulation 4 (PAM4) or PAM8, which is a multi-level modulation and demodulation system, is known. However, according to a multi-level modulation and demodulation system with a PAM or the like, symbols (points) are arranged, for example, on an X-axis. Therefore, the multi-level modulation entails reduction in the inter-symbol distance. Reduction in the inter-symbol distance of a modulated signal significantly shortens the transmission length of an optical fiber transmission line or the like.

The present invention has been made in view of the above-described circumstances and an object of the present invention is to provide an optical transmitter, an optical receiver, and an optical transmission system which allow reduction of optical modules for performing optical communication in size and achieve long distance transmission.

Means for Solving the Problems

An aspect of an embodiment of the present invention is an optical transmitter for transmitting an orthogonal polarization multiplexed optical signal to an optical receiver via an optical fiber transmission line, which may include: two light sources that respectively emit two optical carriers respectively having peak frequency components whose frequencies are spaced apart from each other by a predetermined frequency difference and located such that a central frequency of a predetermined wavelength division multiplexing (WDM) channel falls between the frequencies of the peak frequency components; two optical modulators that respectively generate two modulated signals by modulating the two optical carriers respectively with two binary bit sequences by on-off keying or 2M-level pulse amplitude modulation, where M is a positive integer of 2 or more; and an optical polarizer that generates the orthogonal polarization multiplexed optical signal by multiplexing the two modulated signals by orthogonal polarization multiplexing.

According to this configuration, when an optical receiver receives the orthogonal polarization multiplexed optical signal, the peak frequency components of the two optical carriers are spaced apart from each other by a predetermined frequency difference and located such that the central frequency of the WDM channel falls between the peak frequency components. Due to this, it is possible to obtain two different reception signals by utilizing that frequency difference and restore the two modulated signals, which have been generated by modulating the optical carriers respectively with two binary bit sequences, by performing signal processing on the reception signals. Therefore, it is possible to restore the two binary bit sequences that have been used to respectively modulate the optical carriers.

In general, increasing the number of modulation levels in a modulation system increases the bit rate of the modulated signal but reduces the acceptable loss value of an optical fiber transmission line for the modulated signal. For example, a 4-level pulse-amplitude-modulation signal has a higher bit rate than an on-off keying signal modulated at the same frequency, but the acceptable loss value of an optical fiber transmission line for the 4-level pulse-amplitude-modulation signal is smaller than that of the on-off keying signals. The present invention makes it possible to, for example, use two on-off keying signals, for which the acceptable loss value of the optical fiber transmission line is larger than that for a 4-level pulse-amplitude-modulation signal, to achieve a bit rate equivalent to that of the 4-level pulse-amplitude-modulation signal. As the on-off keying signals can be generated by optical modulators having a small and simple structure for modulating the optical carriers with binary bit sequence data, the optical transmitter employing these optical modulators can be reduced in size. Therefore, it is possible to realize long distance transmission with a small-sized optical module performing optical communication using the optical transmitter.

Another aspect of an embodiment of the present invention is an optical receiver for receiving an orthogonal polarization multiplexed optical signal via an optical fiber transmission line. The orthogonal polarization multiplexed optical signal is generated on a transmission side by generating two modulated signals by modulating two optical carriers respectively with two binary bit sequences by on-off keying or 2M-level pulse amplitude modulation, where M is a positive integer of 2 or more, and multiplexing the two modulated signals by orthogonal polarization multiplexing. The two optical carriers respectively have peak frequency components whose frequencies are spaced apart from each other by a predetermined frequency difference and located such that a central frequency of a predetermined wavelength division multiplexing (WDM) channel of a WDM grid falls between the frequencies of the peak frequency components. The optical receiver includes: an interleaver that transmits and separates the orthogonal polarization multiplexed optical signal into two signals in which optical signal components of the two modulated signals multiplexed in the orthogonal polarization multiplexed optical signal are combined with different combination ratios, by means of a 1-input, 2-output asymmetric filter whose two optical transmittances intersect at the predetermined WDM grid channel and each have a free spectral range equal to or twice a channel spacing of the WDM grid and whose outputs are asymmetric; two detectors that respectively detect the two separated signals and respectively convert the two detected signals into two electrical signals; two A/D converters that respectively convert the two electrical signals converted by the detectors into two digital signals; and a digital signal processor that restores the two modulated signals generated on the transmission side from the two digital signals converted by the A/D converters.

According to this configuration, when an optical receiver receives the orthogonal polarization multiplexed optical signal, the peak frequency components of the two optical carriers are spaced apart from each other by a predetermined frequency difference and located such that the central frequency of the WDM channel falls between the peak frequency components. Due to this, it is possible to obtain two different reception signals by utilizing that frequency difference and restore the two modulated signals, which have been generated by modulating the optical carriers respectively with two binary bit sequences, by performing signal processing on the reception signals. Therefore, it is possible to restore the two binary bit sequences that have been used to respectively modulate the optical carriers.

In general, increasing the number of modulation levels in a modulation system increases the bit rate of the modulated signal but reduces the acceptable loss value of an optical fiber transmission line for the modulated signal. For example, a 4-level pulse-amplitude-modulation signal has a higher bit rate than an on-off keying signal modulated at the same frequency, but the acceptable loss value of an optical fiber transmission line for the 4-level pulse-amplitude-modulation signal is smaller than that of the on-off keying signals. The present invention makes it possible to, for example, use two on-off keying signals, for which the acceptable loss value of the optical fiber transmission line is larger than that for a 4-level pulse-amplitude-modulation signal, to achieve a bit rate equivalent to that of the 4-level pulse-amplitude-modulation signal. As the on-off keying signal is obtained by modulating the optical carriers with binary bit sequence data, it can be easily restored. Therefore, the arithmetic circuit of the digital signal processor that performs the restoration can be reduced in size and simplified and thus the optical receiver employing the digital signal process can be reduced in size. Therefore, it is possible to realize long distance transmission with a small-sized optical module performing optical communication using the optical receiver.

Another aspect of an embodiment of the present invention is an optical transmission system, which may include: a plurality of optical transmitters including a first optical transmitter that outputs an orthogonal polarization multiplexed optical signal; an optical multiplexer for wavelength-multiplexing optical signals outputted from the plurality of optical transmitters to output a wavelength-multiplexed signal, the optical signals including the orthogonal polarization multiplexed optical signal; an optical fiber transmission line through which the wavelength-multiplexed signal is transmitted; an optical demultiplexer for demultiplexing the wavelength-multiplexed signal having been transmitted through the optical fiber transmission line into optical signals of respective wavelengths, and an optical receiver for receiving one of the optical signals demultiplexed by the optical demultiplexer, the one of the optical signals corresponding to the orthogonal polarization multiplexed optical signal. The first optical transmitter generates two modulated optical signals by modulating two optical carriers respectively with two binary bit sequences by on-off keying or 2M-level pulse amplitude modulation, where M is a positive integer of 2 or more, and generates and outputs the orthogonal polarization multiplexed optical signal by multiplexing the two modulated optical signals by orthogonal polarization multiplexing. The two optical carriers respectively have peak frequency components whose frequencies are spaced apart from each other by a predetermined frequency difference and located such that a central frequency of a predetermined wavelength division multiplexing (WDM) channel of a WDM grid falls between the frequencies of the peak frequency components. The optical receiver: separates the orthogonal polarization multiplexed optical signal into two signals in which optical signal components of the two modulated optical signals multiplexed in the orthogonal polarization multiplexed optical signal are combined with different combination ratios, by means of a 1-input, 2-output asymmetric filter whose two optical transmittances intersect at the predetermined WDM channel and each have a free spectral range equal to or twice a channel spacing of the WDM grid and whose outputs are asymmetric; detects and converts the two separated signals respectively into two digital signals; and restores the two modulated optical signals from the converted two digital signals.

According to this configuration, when an optical receiver receives the orthogonal polarization multiplexed optical signal, the peak frequency components of the two optical carriers are spaced apart from each other by a predetermined frequency difference and located such that the central frequency of the WDM channel falls between the peak frequency components. Due to this, it is possible to obtain two different reception signals by utilizing that frequency difference and restore the two modulated signals, which have been generated by modulating the optical carriers respectively with two binary bit sequences, by performing signal processing on the reception signals. Therefore, it is possible to restore the two binary bit sequences that have been used to respectively modulate the optical carriers.

In general, increasing the number of modulation levels in a modulation system increases the bit rate of the modulated signal but reduces the acceptable loss value of an optical fiber transmission line for the modulated signal. For example, a 4-level pulse-amplitude-modulation signal has a higher bit rate than an on-off keying signal modulated at the same frequency, but the acceptable loss value of an optical fiber transmission line for the 4-level pulse-amplitude-modulation signal is smaller than that of the on-off keying signals. The present invention makes it possible to, for example, use two on-off keying signals, for which the acceptable loss value of the optical fiber transmission line is larger than that for a 4-level pulse-amplitude-modulation signal, to achieve a bit rate equivalent to that of the 4-level pulse-amplitude-modulation signal. As the on-off keying signals can be generated by optical modulators having a small and simple structure for modulating the optical carriers with binary bit sequence data, the optical transmitter employing these optical modulators can be reduced in size. Furthermore, the on-off keying signal can be easily restored on the receiving side and the arithmetic circuit of the digital signal processor that performs the restoration can be reduced in size and simplified. Thus, the optical receiver employing the digital signal processor can be reduced in size.

Therefore, it is possible to realize long distance transmission with a small-sized optical module performing optical communication using the optical transmitter and a small-sized optical module performing optical communication using the optical receiver.

Advantageous Effects of the Invention

The present invention makes it possible to reduce optical modules that performs optical communication in size and provide an optical transmitter, an optical receiver, and an optical transmission system which realize long distance transmission.

BRIEF DESCRIPTION OF DRAWINGS

FIG. 2 is a diagram showing peak frequency components of the carriers and the transmission state of reception signals, where the horizontal axis indicates the frequency of the optical signal, the left vertical axis indicates the intensity of the optical signal, and the right vertical axis indicates the transmission rate of the optical signal.

FIG. 3 is a diagram showing the transmitted signal in which the peak frequency component of the carrier of Ch1 is higher than that of Ch2, where the horizontal axis indicates the frequency of the optical signal, the left vertical axis indicates the intensity of the optical signal, and the right vertical axis indicates the transmission rate of the optical signal.

FIG. 4 is a diagram showing the transmitted signal in which the peak frequency component of the carrier of Ch2 is higher than that of Ch1, where the horizontal axis indicates the frequency of the optical signal, the left vertical axis indicates the intensity of the optical signal, and the right vertical axis indicates the transmission rate of the optical signal.

DESCRIPTION OF EMBODIMENTS

Hereinafter, an embodiment of the present invention will be described with reference to the drawings.

Configuration of Embodiment

Figure 1:
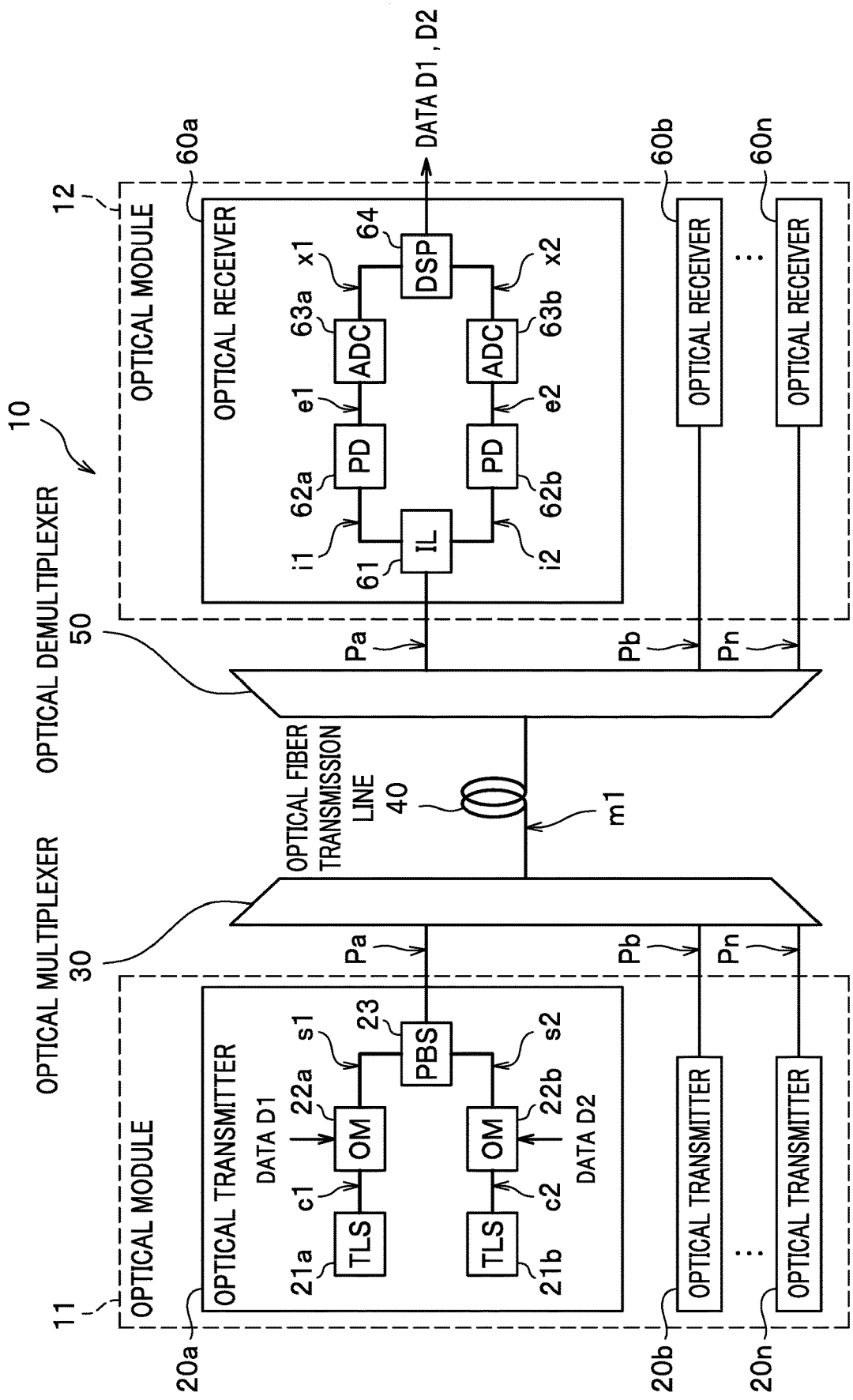
FIG. 1 is a block diagram showing the configuration of an optical transmission system using an optical transmitter and an optical receiver according to an embodiment of the present invention.

FIG. 1 is a block diagram showing a configuration of an optical transmission system using optical transmitters and optical receivers according to an embodiment of the present invention.

The optical transmission system 10 shown in FIG. 1 includes an optical module 11 on the transmission side, an optical multiplexer 30, an optical fiber transmission line 40, an optical demultiplexer 50, and an optical module 12 on the reception side. Note that each of the optical modules 11 and 12 is of the pluggable type, to which devices are able to be detachably attached. The optical module 11 on the transmission side includes a plurality of optical transmitters 20*a*, 20*b*, . . . , 20*n*, each of which is detachably attached to the optical module 11. The optical module 12 on the reception side includes a plurality of optical receivers 60*a*, 60*b*, . . . , 60*n*, each of which is detachably attached to the optical module 12.

Wavelength division multiplexing (WDM) uses, for example in a frequency grid with 50-GHz spacing, 80 to 96 waves each of which is different in wavelength. The optical transmitters 20*a* to 20*n* and the optical receivers 60*a* to 60*n* are each deployed for the number of the wavelengths, i.e., 80 to 96. Note that the frequency grid of WDM is also referred to as a WDM grid.

Each of the optical transmitters 20a to 20n includes tunable laser sources (TLSs) 21a and 21b, optical modulators (OMs) 22a and 22b, and a polarization beam splitter (PBS) 23, like the optical transmitter 20a representatively illustrated. These components will be described by describing the optical transmitter 20a representatively illustrated. Note that the OM 22a constitutes a first optical modulator described in the claims, and the OM 22b constitutes a second optical modulator described in the claims.

The two TLSs 21a and 21b are tunable laser sources, and emit carriers (optical carriers) c1 and c2 of two channels of different frequencies. One of the two channels is referred to as channel Ch1 (first channel), and the other is referred to as channel Ch2 (second channel). To explain further, the TLS 21a emits the carrier c1 of the channel Ch1 to the OM 22a and the TLS 21b emits the carrier c2 of the channel Ch2 to the OM 22b, where the peak frequency components of the carriers c1 and c2 are spaced apart from each other by a predetermined frequency difference $\Delta f$ (see FIG. 2).

One OM 22a outputs an ON-OFF Keying (OOK) signal s1 of the channel Ch1 by optically modulating the carrier c1 of the channel Ch1 emitted from the TLS 21a with data D1 (first data). The other OM 22b outputs an OOK signal s2 of the channel Ch2 by optically modulating the carrier c2 of the channel Ch2 emitted from the TLS 21b with data D2 (second data). Data D1 and D2 are binary bit sequences. The OOK signal s1 of the channel Ch1 includes the carrier c1 of the channel Ch1 and has a peak frequency component P1 of the carrier c1; and the OOK signal s2 of the channel Ch2 includes the carrier c2 of the channel Ch2 and has a peak frequency component P2 of the carrier c2. The peak frequency components P1 and P2 are spaced apart from each other by the frequency difference $\Delta f$ and are located such that a central frequency f0 of a WDM channel falls between the peak frequency components P1 and P2.

FIG. 2 shows the frequency of the optical signal on the horizontal axis, the intensity of the optical signal on the left vertical axis, and the transmission rate of the optical signal on the right vertical axis. On the horizontal axis, repetition of spacing Mg (for example, 50 GHz) of the WDM grid is shown on both sides of the central frequency f0 of the WDM channel. That is, f0−$\Delta$fg and f0−2$\Delta$fg are shown in order on the left side of f0, and f0+$\Delta$fg and f0+2$\Delta$fg are shown in order on the right side of f0.

The solid line curve it (x1) extending in an upper part of FIG. 2 in the lateral direction indicates the transmitted signal it (FIG. 1) transmitted through the IL 61 of each of optical receivers 60a to 60n, which will be described later, or indicates the reception signal x1 (FIG. 1) obtained by digitizing this signal i1. The dashed line curve i2 (x2) extending in the lateral direction indicates the transmitted signal i2 (FIG. 1) transmitted through the IL 61 or indicates the reception signal x2 (FIG. 1) obtained by digitizing this signal i2. The arrow Y1 pointing to the right from the dashed line frame surrounding the transmitted signals it and i2 indicates that the transmission rate of each of the curves it (x1) and i2 (x2) is represented on the right vertical axis.

The mountain-shaped solid line curve P1a shown at the bottom of FIG. 2 represents a frequency spectrum that has been spread due to the modulation of the carrier c1 of the channel Ch1 with data D1 on the transmission side. The mountain-shaped dashed line curve P2a represents a frequency spectrum that has been spread due to the modulation of the carrier c2 of the channel Ch2 with data D2 on the transmission side. The arrow Y2 pointing to the left from the dashed line frame surrounding the carrier peak frequency components P1 and P2 and the mountain-shaped frequency spectra P1a and P2a indicates that the intensities of the peak frequency component P1 of the carrier c1, the peak frequency component P2 of the carrier c2, and the mountain-shaped frequency spectra P1a and P2a are represented on the left vertical axis.

The PBS 23 shown in FIG. 1 generates a dual-polarization (DP) OOK signal Pa by multiplexing the OOK signal s1 of the channel Ch1 and the OOK signal s2 of the channel Ch2 by orthogonal polarization. This DP-OOK signal Pa is output to the optical multiplexer 30. Similarly, DP-OOK signals Pb to Pn are also outputted from other optical transmitters 20b to 20n to the optical multiplexer 30. Every OOK signals s1 and s2 multiplexed in the DP-OOK signals Pa to Pn by orthogonal polarization multiplexing have different wavelengths.

The optical multiplexer 30 generates a wavelength-multiplexed signal ml by wavelength-multiplexing the DP-OOK signals Pa to Pn outputted from the respective optical transmitters 20a to 20n and transmits the wavelength-multiplexed signal ml to the optical fiber transmission line 40. In this transmission, the DP-OOK signals Pa to Pn do not interfere with one another because every OOK signals s1 and s2, multiplexed by orthogonal polarization multiplexing in the DP-OOK signals Pa to Pn, have different wavelengths.

In intermediate locations of the optical fiber transmission line 40, not shown erbium-doped fiber amplifiers (EDFAs) are connected. The EDFAs are optical amplifiers for compensating for the transmission loss of the optical fiber transmission line 40.

The optical demultiplexer 50 demultiplexes the wavelength-multiplexed signal ml transmitted through the optical fiber transmission line 40 into DP-OOK signals Pa to Pn of the respective optical transmitters 20a to 20n. The demultiplexed DP-OOK signals Pa to Pn are inputted to the optical receivers 60a to 60n respectively corresponding to the optical transmitters 20a to 20n.

Each of the optical receivers 60a to 60n includes an interleaver (IL) 61; photo detectors or photo diodes (PDs) 62a and 62b; analog to digital converters (ADCs) 63a and 63b, and a digital signal processor (DSP) 64, as shown for the optical receiver 60a representatively illustrated. These components of the optical receiver 60a will be representatively described. Note that the PDs 62a and 62b each constitute the detector described in the claims. The PD 62a constitutes the first photo detector described in the claims, and the PD 62b constitutes the second photo detector described in the claims.

The IL 61 is a 1-input, 2-output asymmetric filter having predetermined two optical transmittances (optical transmission rate). When one optical signal is input to the filter, the filter outputs a signal with a first wavelength largely from one output and outputs a signal with a second wavelength, which is symmetrical to the first wavelength, largely from the other output. The IL 61 is configured such that the two optical transmittances intersect at the WDM channel and the free spectral range (FSR) of the IL 61, representing the width of the input range of the IL 61, has a bandwidth equal to or twice as large as the channel spacing of the WDM grid. In other words, the IL 61 is a filter having such optical transmission characteristics that the FSR has a bandwidth equal to or twice as wide as the channel spacing and having asymmetric outputs.

The IL 61 has optical transmission characteristics such that, when the DP-OOK signal Pa, in which the OOK signal s1 of the channel Ch1 and the OOK signal s2 of the channel Ch2 have been multiplexed by orthogonal polarization multiplexing, is received from the optical demultiplexer 50 and transmitted through the IL 61, the OOK signal s1 of the channel Ch1 is largely transmitted as a signal on the output connected to the PD 62a and the OOK signal s2 of the channel Ch2 is largely transmitted as a signal on the output connected to the other PD 62b.

The PDs 62a and 62b, shown in FIG. 1, are each a semiconductor element whose charge storage capacity changes according to the inputted light and which converts an optical signal into an electrical signal. The PD 62a converts the transmitted signal i1, which is an optical signal, into an electrical signal e1, and outputs the electrical signal e1 to the ADC 63a. The PD 62b converts the transmitted signal i2, which is an optical signal, into an electrical signal e2, and outputs the electrical signal e2 to the ADC 63b.

The ADC 63a converts the electrical signal e1, which is an analog signal, into a digital reception signal x1, and outputs the digital reception signal x1 to the DSP 64. The ADC 63b converts the electrical signal e2, which is an analog signal, into a digital reception signal x2, and outputs the digital reception signal x2 to the DSP 64.

Assuming that the propagation direction of an optical signal s1 is z, the optical signal s1 can be decomposed into orthogonal components $s_{1x}$ and $s_{1y}$ in x-axis and y-axis directions orthogonal to the z-axis, and is expressed by the following equation.

[Equation 1]

$$s_1(z,t) = \begin{pmatrix} s_{1x}(z,t) \\ s_{1y}(z,t) \end{pmatrix} = \begin{pmatrix} |A_{1x}(z,t)|\cos(\omega t + kz) \\ |A_{1y}(z,t)|\cos(\omega t + kz + \delta) \end{pmatrix} \quad (1)$$

Here, $|A_{1x}|$ and $|A_{1y}|$ are the respective amplitudes; w is the angular frequency of an optical signal carrier; k is a wave number; and $\delta$ is a phase difference. Equation (1) with z=0 is expressed by the following equation, denoting $s_1(z,t)$ as $s_1(t)$.

[Equation 2]

$$s_1(t) = \begin{pmatrix} s_{1x}(t) \\ s_{1y}(t) \end{pmatrix} = \begin{pmatrix} |A_{1x}(t)|\cos(\omega t) \\ |A_{1y}(t)|\cos(\omega t + \delta) \end{pmatrix} \quad (2)$$

The following equation (3) can be obtained by removing $\omega$n from equation (2).

[Equation 3]

$$\frac{s_{1x}^2(t)}{|A_{1x}(t)|^2} - 2\frac{s_{1x}(t)s_{1y}(t)}{|A_{1x}(t)||A_{1y}(t)|}\cos\delta + \frac{s_{1y}^2(t)}{|A_{1y}(t)|^2} = \sin^2\delta \quad (3)$$

This is an equation representing an ellipse, representing that the electric field of $s_1(t)$ rotates in an orbit of the ellipse over time. An optical signal $s_2(t)$ in a polarization state orthogonal to $s1(t)$ with an angular frequency of $\omega'=\omega+\Delta\omega$ is expressed by the following equation (4). Note that $|A_{2x}(t)|$ and $|A_{2y}(t)|$ satisfy $|A_{1x}(t)|/|A_{1y}(t)|=|A_{2y}(t)|/|A_{2x}(t)|$.

[Equation 4]

$$s_2(t) = \begin{pmatrix} s_{2x}(t) \\ s_{2y}(t) \end{pmatrix} = \begin{pmatrix} |A_{2x}(t)|\cos(\omega' t) \\ |A_{2y}(t)|\cos(\omega' t + \delta - \pi) \end{pmatrix} \quad (4)$$

Let $I_1(t)$ and $I_2(t)$ be the signals that can be obtained by directly detecting the above $s_1(t)$ and $s_2(t)$ with a photo detector (PD), respectively. Considering that the bandwidth of the PD is sufficiently narrow compared to $\omega$, $I_1(t)$ and $I_2(t)$ are expressed by the following equation.

[Equation 5]

$$\begin{cases} I_1(t) = \frac{1}{2}\{|A_{1x}(t)|^2 + |A_{1y}(t)|^2\} \\ I_2(t) = \frac{1}{2}\{|A_{2x}(t)|^2 + |A_{2y}(t)|^2\} \end{cases} \quad (5)$$

Here, a case where $s_1(t)$ and $s_2(t)$ pass through an optical filter is considered. Assuming that the electric field transmission rates of the optical filter for $s_1(t)$ and $s_2(t)$ are respectively $\sqrt{h_1}$ and $\sqrt{h_2}$ ($0<h_i<1$, i=1, 2), a signal e(t) that can be obtained by detecting $s_1(t)$ and $s_2(t)$ by the PD directly and simultaneously is expressed by the following equation.

[Equation 6]

$$e(t) = |\sqrt{h_1}\,s_{1x}(t) + \sqrt{h_2}\,s_{2x}(t)|^2 + |\sqrt{h_1}\,s_{1y}(t) + \sqrt{h_2}\,s_{2y}(t)|^2 = \quad (6)$$
$$\frac{h_1}{2}\{|A_{1x}(t)|^2 + A_{1y}(t)|^2\} + \frac{h_2}{2}\{|A_{2x}(t)|^2 + A_{2y}(t)|^2\} + \sqrt{h_1 h_2}$$
$$\{|A_{1x}(t)||A_{2x}(t)| - |A_{1y}(t)||A_{2y}(t)|\}\cos(\Delta\omega t) = h_1 I_1(t) + h_2 I_2(t)$$

It is understood from equation (6) that the component of the difference frequency $\Delta\omega$ between $s_1(t)$ and $s_2(t)$ is canceled in e(t) when $s_1(t)$ and $s_2(t)$ are orthogonal to each other, and that e(t) is represented by a linear combination of the intensity signals $I_1(t)$ and $I_2(t)$, which would be obtained by directly detecting $s_1(t)$ and $s_2(t)$, respectively.

When the electric field transmission rates of the IL 61 for $s_1(t)$ and $s_2(t)$ in the output connected to the PD 62a are respectively denoted as $\sqrt{h_{11}}$ and $\sqrt{h_{12}}$, the output of the PD 62a is denoted as $e_1(t)$, the electric field transmission rates of the IL 61 for $s_1(t)$ and $s_2(t)$ in the output connected to the other PD 62b are respectively denoted as $\sqrt{h_{21}}$ and $\sqrt{h_{22}}$, and the output of the PD 62b is denoted as $e_2(t)$, $e_1(t)$ and $e_2(t)$ are expressed by the following equation.

[Equation 7]

$$\begin{pmatrix} e_1(t) \\ e_2(t) \end{pmatrix} = \begin{pmatrix} h_{11} I_1(t) + h_{12} I_2(t) \\ h_{21} I_1(t) + h_{22} I_2(t) \end{pmatrix} = \begin{pmatrix} h_{11} & h_{12} \\ h_{21} & h_{22} \end{pmatrix}\begin{pmatrix} I_1(t) \\ I_2(t) \end{pmatrix} = H\begin{pmatrix} I_1(t) \\ I_2(t) \end{pmatrix} \quad (7)$$

The OOK signal s1 of the channel Ch1 and the OOK signal s2 of the channel Ch2, which have been multiplexed by orthogonal polarization multiplexing and then transmitted through the IL 61 as the transmitted signals i1 and i2, are directly detected by the PDs 62a and 62b and then converted to digital signals by the ADCs 63a and 63b. This process obtains sampling data x1 and x2 of two reception signals in which OOK signals s1 and s2, which are the respective intensity signals of the channels Ch1 and Ch2, are combined with different combination ratios. This is represented in the above equation.

The DSP 64 restores the direct detection signal I1 of the OOK signal s1 and the direct detection signal I2 of the OOK signal s2 from the two sampling data x1 and x2, where the OOK signals s1 and s2 have been generated on the transmission side by modulating the carrier c1 of the channel Ch1 and the carrier c2 of the channel Ch2 respectively with the data D1 and D2. The DSP 64 then performs an arithmetic process to calculate the data D1 and D2 from the direct detection signals I1 and I2. This arithmetic process is performed as follows. As the OOK signal s1 of the channel Ch1 and the OOK signal s2 of the channel Ch2 are independent from each other, the direct detection signals I1 and I2 are restored using an algorithm for performing a process for separating two different signals from each other, and then the data D1 and D2 are calculated from the obtained direct detection signals I1 and I2. The above algorithm is described, for example, in the independent component analysis method described in Non-Patent Document 1.

Here, the DSP 64 restores the direct detection signals I1 and I2 by using the following equation (8) in the algorithm. Note that H, shown in equation (7), represents weighting factors for combining the direct detection signal I1 of the OOK signal s1 and the direct detection signal I2 of the OOK signal s2 with different combination ratios; n is a positive integer representing the number of times of sampling; t0 is the time at n=1; and ΔT is a sampling interval.

[Equation 8]

$$\begin{pmatrix} x1(n) \\ x2(n) \end{pmatrix} = H \begin{pmatrix} I1(t_0 + \Delta T(n-1)) \\ I2(t_0 + \Delta T(n-1)) \end{pmatrix} \quad (8)$$

Here, the process of restoring the direct detection signal I1 of the OOK signal s1 and the direct detection signal I2 of the OOK signal s2 using the above equation (8) will be further described. As the sampling data x1 and x2 input to the DSP 64 are respectively equivalent to e1 and e2 as described above, the process will be described below using e1 and e2. By passing through the IL 61, the component of the Ch1 OOK signal s1 becomes larger (Ch1>Ch2) in the reception signal e1 and the component of the Ch2 OOK signal s2 becomes larger (Ch1<Ch2) in the reception signal e2. The signal components of the channels Ch1 and Ch2 are in such a state that, when they are received normally, the respective intensities of the signal components are combined, because the respective carriers c1 and c2 are orthogonal to each other. Therefore, it is not possible to determine which of the signal components of the carriers c1 and c2 is "1" or "0".

However, as described above, the reception signals e1 and e2 can be represented by multiplying the matrix H by the direct detection signal I1 of the OOK signal s1 and the direct detection signal I2 of the OOK signal s2. Accordingly, two different conditional equations are obtained as shown in the above equation (8). By solving this equation (8), the direct detection signals I1 and I2 of the respective OOK signals s1 and s2, which are the original transmission signals, can be obtained (restored).

As the characteristics of the IL 61 is cyclic, the interleaver characteristics are the same, for example, at central frequencies f0−Δfg and f0+Δfg of the WDM channels. Therefore, even when the signal is transmitted with the wavelength of another WDM channel, the reception process can be performed in the same manner. That is, no matter which WDM channel is used to send the OOK signals s1 and s2 from the transmission side, the reception side can receive the reception signals e1 and e2 in the same manner and the direct detection signal I1 of the OOK signal s1 and the direct detection signal I2 of the OOK signal s2 can be restored.

Note that the direct detection signal I1 of the OOK signal s1 and the direct detection signal I2 of the OOK signal s2, which are restored by the DSP 64, are also binary OOK signals and have a higher reception sensitivity than 4-level pulse-amplitude modulation (PAM4) with an equivalent bit rate. In addition, as a matrix equation of order 2 can be defined for the DP-OOK signals in any WDM channel as in the above equation (1), it is possible to apply the technique of the present embodiment also to an optical module for transmitting or receiving the DP-OOK signals in any WDM channel.

Specific Example of Embodiment

Figure 5:
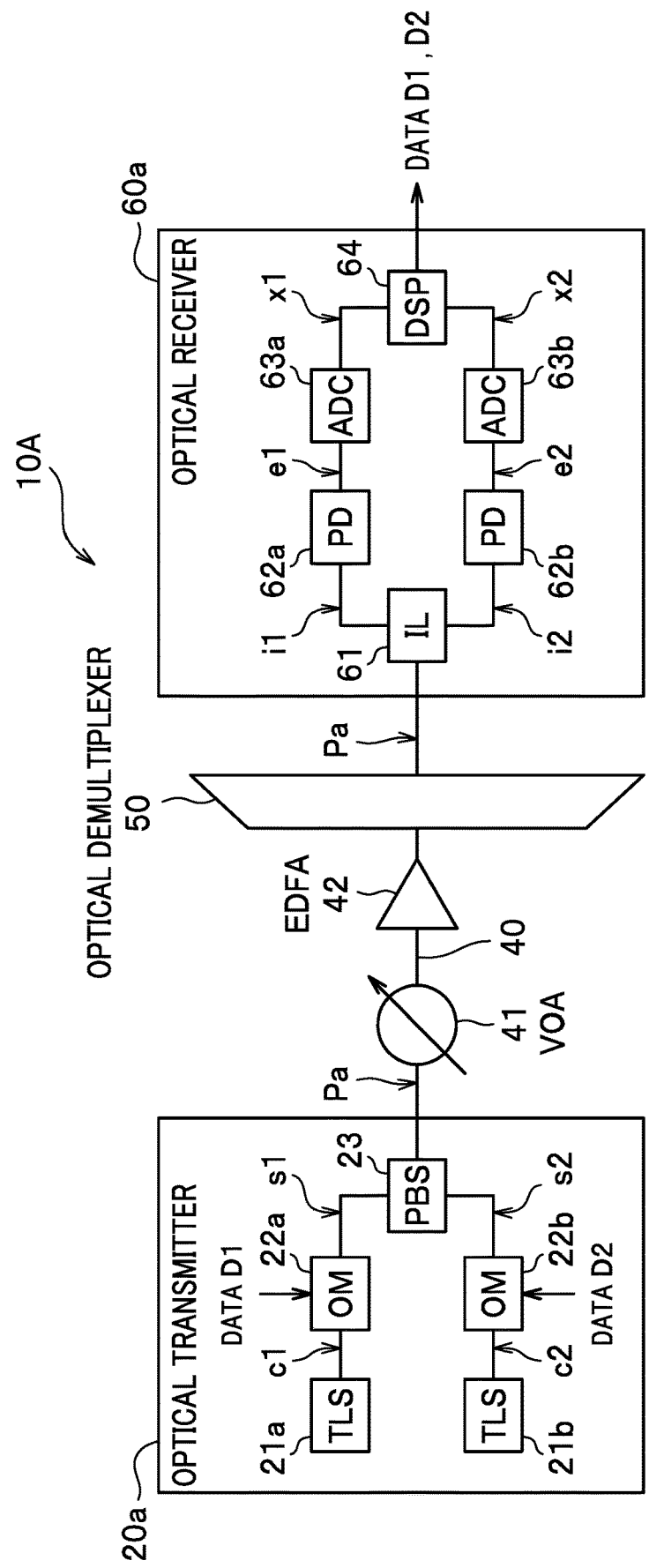
FIG. 5 is a block diagram showing the configuration of an optical transmission system using an optical transmitter and an optical receiver according to a specific example of the present embodiment.

FIG. 5 shows the configuration of an optical transmission system 10A of a specific example according to the present embodiment. A simulation operation of transmitting and receiving an optical signal by this optical transmission system 10A will be described below. Note that the same elements in FIG. 5 as those in FIG. 1 are given the same reference numerals, and descriptions thereof will be omitted.

The optical transmission system 10A, shown in FIG. 5, differs from the optical transmission system 10 (FIG. 1) in that the optical transmitter 20a and the optical receiver 60a are each provided solely and a variable optical attenuator (VOA) 41 and an EDFA 42 are connected at an intermediate point of the optical fiber transmission line 40. Note that the optical transmission system 10A does not include the optical multiplexer 30 on the transmission side.

The VOA 41 is a variable optical attenuator that simulates the transmission loss (loss value) of the optical fiber transmission line 40.

The EDFA 42 is an optical amplifier for compensating for transmission loss, as described above. If the transmission loss is large, it is necessary to increase the gain of the EDFA 42. However, when the gain is increased, the noise also increases, and the influence of the noise makes it impossible to receive the optical signal. For this reason, the length of the optical fiber transmission line 40 is generally limited.

The optical transmission system 10A operates by the pair of the optical transmitter 20a and the optical receiver 60a performing transmission and reception of an optical signal in the same manner as in the optical transmission system 10 (FIG. 1) described above. In the optical transmission system 10A, a 2×25.8-Gbit/s DP-OOK signal Pa with a frequency spacing of 6.25 GHz was transmitted and the reception characteristic versus the loss value of the VOA 41 simulating the transmission line loss was evaluated by the error vector magnitude (EVM) (Non-Patent Documents 2, 3). The EVM is an indicator of the quality of a digital modulation signal and indicates the amount of error in the reception signal. The well-known Independent Component Analysis (FastICA) algorithm described in Non-Patent Document 4 or the like was used as the algorithm performed by the DSP 64.

Figure 6:
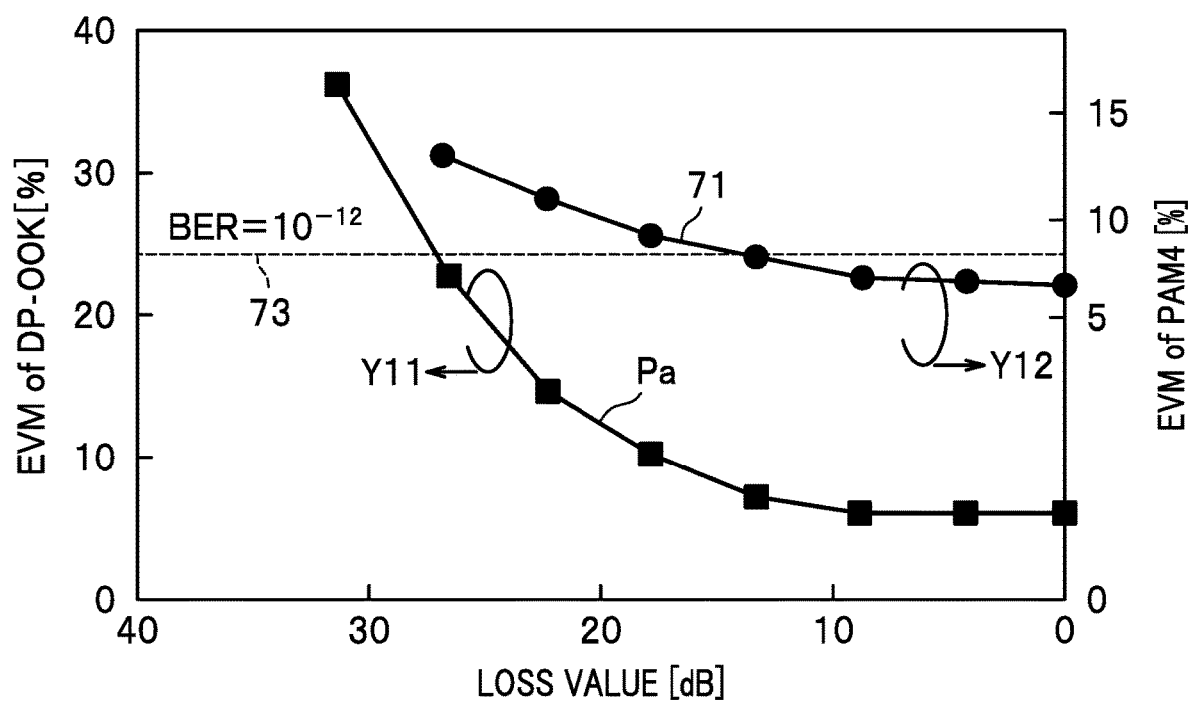
FIG. 6 is a diagram in which the horizontal axis indicates the loss value [dB] of a VOA, the left vertical axis indicates the EVM of a DP-OOK signal (EVM of DP-OOK [%]) corresponding to the loss value, and the right vertical axis indicates the EVM of a PAM4 signal (EVM of PAM4 [%]) which is a multi-level modulation-demodulation signal with a bit rate equivalent to the DP-OOK signal on the left vertical axis.

The horizontal axis of FIG. 6 indicates the loss value [dB] of the VOA 41, and the left vertical axis indicates the EVM of the DP-OOK signal Pa (EVM of DP-OOK [%]) corresponding to the loss value. The arrow Y11 pointing to the left from the frame surrounding the DP-OOK signal Pa indicates that the EVM of the DP-OOK signal Pa is represented by the percentage on the left vertical axis.

The EVM of a PAM4 signal 71 (EVM of PAM4 [%]), which is a multilevel modulated and demodulated signal with a bit rate equivalent to that of the DP-OOK signal on the left vertical axis, is shown on the right vertical axis for comparison. The arrow Y12 pointing to the right from the frame surrounding the PAM4 signal 71 indicates that the EVM of the PAM4 signal 71 is expressed by the percentage on the right vertical axis.

That is, the vertical axes of EVM of DP-OOK [%] and EVM of PAM4 [%] are adjusted so that their bit error rates become equal to each other.

Comparing the DP-OOK signal Pa with the PAM4 signal 71 at an EVM [%] corresponding to a bit error rate (BER) of $10^{-12}$, indicated by a dashed line 73 extending in the horizontal direction in FIG. 6, the acceptable loss value is 13.5 dB in the case of the PAM4 signal 71, whereas, in the case of the present embodiment, the acceptable loss value is increased to 27 dB due to the use of the DP-OOK signal Pa. This means that the DP-OOK signal Pa can be received correctly even if the loss value of the VOA 41 is increased by about 13 dB relative to that of the case of the PAM4 signal 71.

That is, when the loss coefficient of the optical fiber transmission line 40 is 0.45 dB/km, the transmission distance of the PAM4 signal 71 is 13.5 dB÷ 0.45 dB/km=30 km. The transmission distance of the DP-OOK signal Pa is 27 dB÷ 0.45 dB/km=60 km. Therefore, in the specific example of the present embodiment, it is possible to increase the length of the optical fiber transmission line 40 by 30 km=60 km–30 km.

In this specific example, although the measurement example is made by the pair of the optical transmitter 20a and the optical receiver 60a, a similar result is expected when the transmission system is constituted by a plurality of optical transmitters 20a to 20n and a plurality of optical receivers 60a to 60n (see FIG. 1).

Experimental Result

Next, a description will be given of the result of an experiment on the transmission and reception of optical signals with the configuration of the optical transmission system 10A shown in FIG. 5. Note that the experiment was conducted with a configuration in which the following optical fiber was connected between the optical transmitter 20a and the VOA 41 shown in FIG. 5. The length of the optical fiber was 50 km in the case of DP-OOK and 25 km in the case of DP-PAM4. The VOA 41 was adjusted so that the input level to the EDFA 42 becomes constant in both cases.

A 12.5-Gbaud, polarization-multiplexed intensity signal with a frequency spacing Δf and a central wavelength of 1552.52 nm was transmitted through an optical fiber conforming to International Telecommunication Union Telecommunication Standardization Sector (ITU-T) international standard G.652 and having an optical loss of 0.28 dB/km. The bit error rate (BER) of the transmitted signal was measured to evaluate the transmission characteristics.

Note that the FastICA (independent component analysis) algorithm was used as the blind equalization algorithm like the above. The blind equalization algorithm was used to derive the transmission signals s1 and s2 from the reception data x1 and x2 in the optical receiver 60a.

Figure 7A:
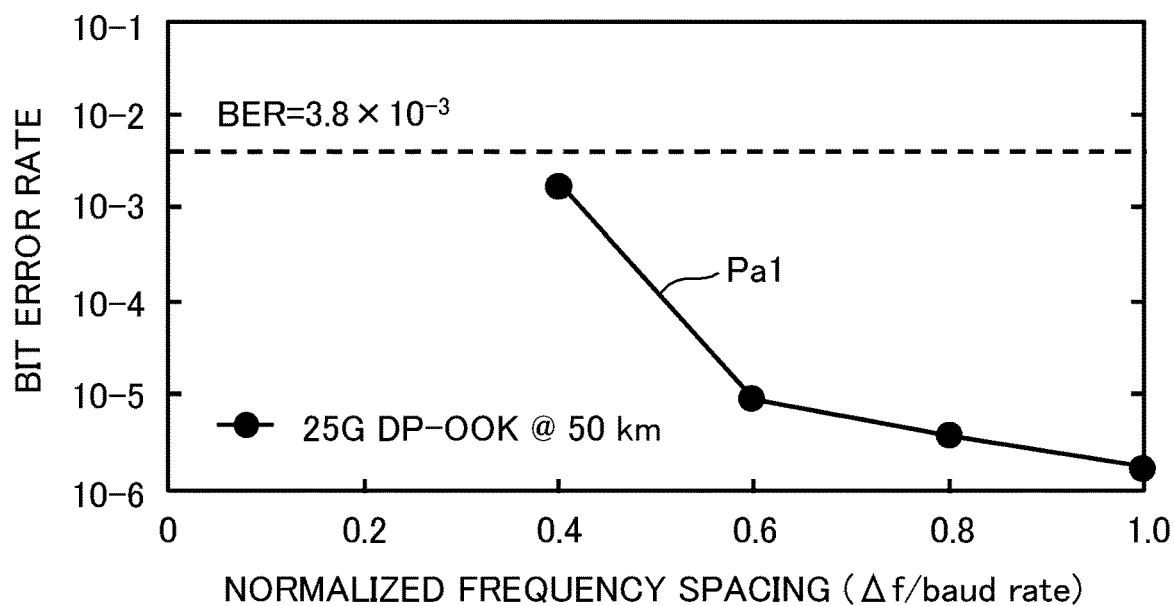
FIG. 7A is a diagram showing the bit error rate (vertical axis) corresponding to the normalized frequency spacing (horizontal axis) of a 25-Gbit/s DP-OOK signal.

The 25-Gbit/s DP-OOK signal Pa1 sent from the optical transmitter 20a (FIG. 5) was transmitted over 50 km (denoted as 25G DP-OOK @ 50 km in FIG. 7A) and then attenuated using a variable optical attenuator (VOA 41 in FIG. 5) so that the optical input level to the optical receiver 60a was –19 dBm. FIG. 7A shows the bit error rate (vertical axis) of that signal corresponding to the normalized frequency spacing (horizontal axis).

Note that the normalized frequency spacing is Δf/baud rate. A reading of 1.0 on the horizontal axis representing the frequency spacing Δf/baud rate corresponds to a 12.5 Gbaud signal with a frequency spacing of 12.5 GHz. That means, a 25-Gbit/s DP-OOK signal Pa1, into which two 12.5 Gbaud signals were multiplexed (2 bit), was used as a transmission signal, and the frequency spacing was varied.

As described above, the parameter on the horizontal axis in this experimental result (FIG. 7A) is different from that in the simulation (FIG. 6). That is, the experiment was conducted to observe the effect of changing the wavelength spacing at a certain loss value (for example, 19 dB in FIG. 6).

Figure 7B:
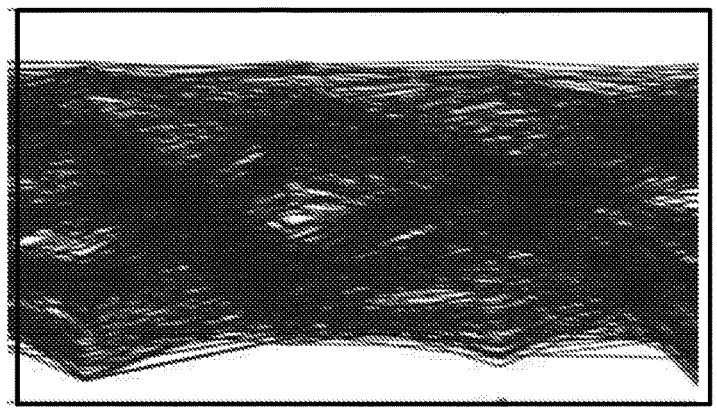
FIG. 7B is a diagram showing the waveform of reception data of one channel h, which reception data is obtained by converting the DP-OOK signal shown in FIG. 7A into a digital signal by an ADC in an optical receiver.
Figure 7C:
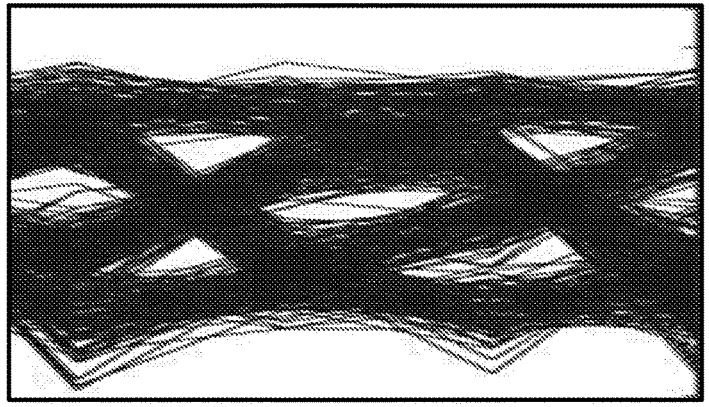
FIG. 7C is a diagram showing the sampling waveform of an ICA output of a DSP in the optical receiver, representing the DP-OOK signal shown in FIG. 7A.

Assuming that the forward error correction (FEC) limit is a BER of $3.8 \times 10^{-3}$, which is indicated by a horizontal dashed line, a BER equal to or less than the FEC limit was achieved with a normalized frequency spacing of not less than 0.4. FIG. 7B shows the waveform of the signal of the channel 1 in a case where a DP-OOK signal Pa1 with a normalized frequency spacing of 0.4 was received without FastICA. FIG. 7C shows the waveform of the signal of the channel 1 in a case where a DP-OOK signal Pa1 with a normalized frequency spacing of 0.4 was received with FastICA.

FIG. 7B shows the waveform of the reception data x1 of the channel Ch1, which was obtained by converting the transmitted signal it of the channel Ch1, received by the optical receiver 60a and having been transmitted through one IL 61, into the electrical signal e1 by the PD 62a and then further converting the converted signal to a digital signal by the ADC 63a. This waveform corresponds to x1 of equation (8) described above, in which the OOK signal s1 of the channel Ch1 and the OOK signal s2 of the channel Ch2 in the optical transmitter 20a have been mixed at a predetermined ratio.

FIG. 7C shows the waveform of the signal which is obtained by performing signal processing on the reception data x1 with the DSP 64 to estimate the OOK signals s1 and s2. That means, although the two OOK signals s1 and s2 have been mixed in the waveform shown in FIG. 7B and their respective waveforms cannot be identified, they can be identified as shown in FIG. 7C when the two OOK signals s1 and s2 are separated. Thus, it is understood that polarized signals are separated by using FastICA.

That is, data D1 and D2 are obtained by the DSP 64 performing a binary determination on the sampled waveform (waveform shown in FIG. 7C) of the ICA output in the DSP 64. The binary data D1 and D2 was compared with the original data D1 and D2 on the transmission side to derive the BER.

Figure 8A:
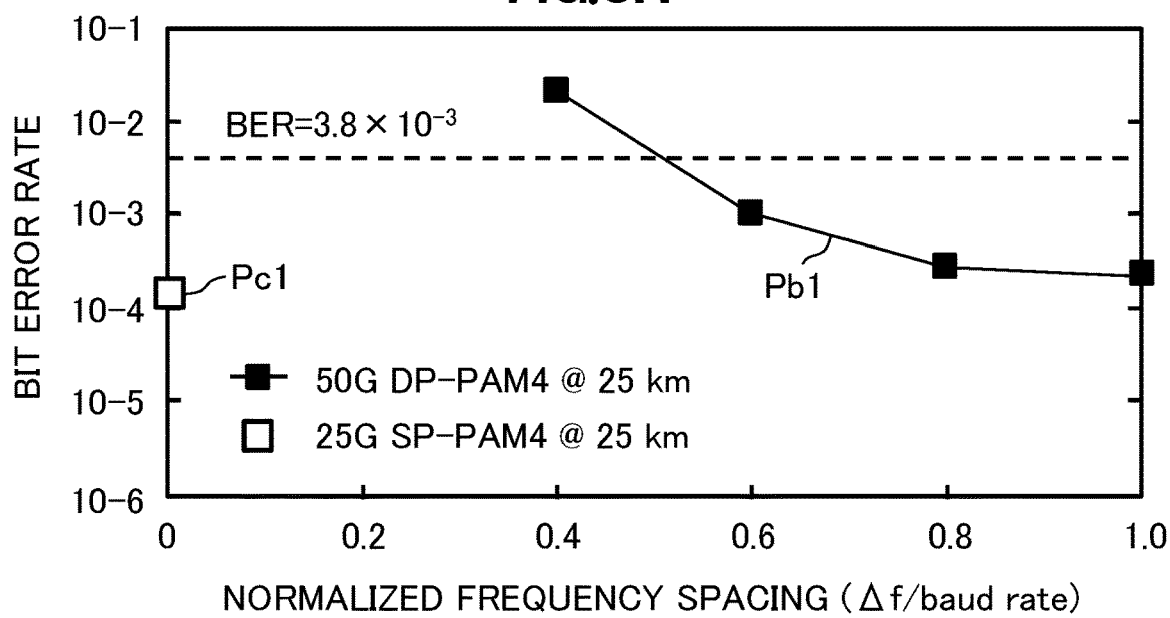
FIG. 8A is a diagram showing the bit error rate (vertical axis) corresponding to the normalized frequency spacing (horizontal axis) of a 50-Gbit/s DP-PAM signal.

Next, a 50-Gbit/s DP-PAM4 signal PH sent from the optical transmitter 20a (FIG. 5) was transmitted over 25 km (denoted as 50G DP-PAM4 @ 25 km in FIG. 8A) and then attenuated using a variable optical attenuator (VOA 41) so that the optical input level to the optical receiver 60a was –19 dBm. FIG. 8A shows the bit error rate (vertical axis) of that signal corresponding to the normalized frequency spacing (horizontal axis). Note that the scales of the horizontal axis and the vertical axis and the condition regarding the FEC limit are the same as in FIG. 7A.

The plot of the DP-PAM4 signal Pb1 shows that a BER of not larger than the FEC limit was achieved with a normalized frequency spacing of not less than 0.6. Therefore, it is understood that the optical transmission system 10 of the present invention is also effective for the PAM4 signal Pb1. For comparison, a single-polarization 25-Gbit/s SP-PAM4 signal Pc1 was transmitted over 25 Km (denoted as 25G SP-PAM4 @ 25 km in FIG. 8A). The BER of the transmitted signal is indicated as Pc1 in FIG. 8A.

Figure 8B:
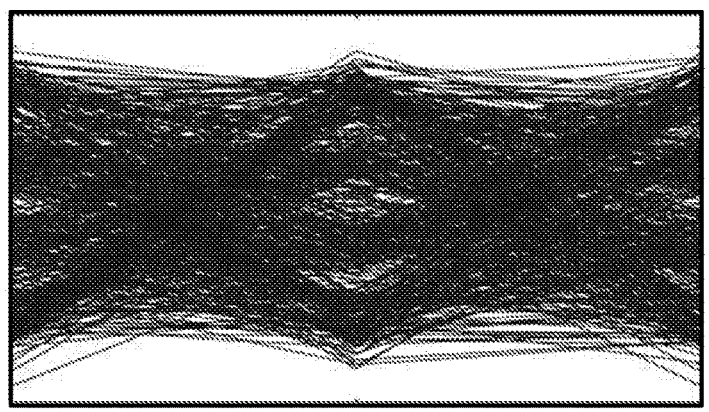
FIG. 8B is a diagram showing the waveform of reception data of one channel, which reception data is obtained by converting the DP-PAM signal shown in FIG. 8A into a digital signal by an ADC in an optical receiver.
Figure 8C:
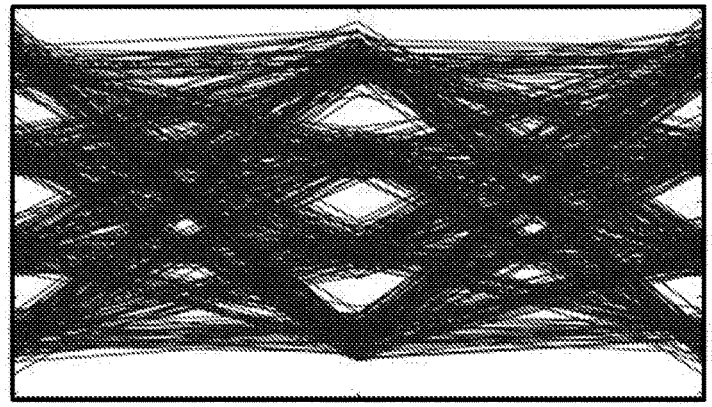
FIG. 8C is a diagram showing the sampling waveform of an ICA output of a DSP in an optical receiver, representing the DP-PAM signal shown in FIG. 8A.

In addition, FIG. 8B shows the waveform of the reception signal of the channel 1 (Ch1) in a case where a DP-PAM4 signal Pb with a normalized frequency spacing of 0.6 was transmitted and received without FastICA. FIG. 8C shows the waveform of the reception signal of the channel 1 in a case where a DP-PAM4 signal Pb1 with a normalized frequency spacing of 0.6 was transmitted and received with FastICA.

Note that FIG. 8C shows the waveform outputted from a decision feedback equalizer (DFE) (not shown) serving in the DSP 64 as a digital filter that makes a determination for a multi-level signal. The waveform shown in FIG. 8B is the same as the waveform at 25 km point in FIG. 7B.

It is understood that the DP-OOK signal Pa1 with a normalized frequency spacing of not less than 0.6, shown in FIG. 7A, has better transmission characteristics than the single-polarization PAM4 signal Pb1 with the same bit rate, shown in FIG. 8A, despite the fact that the transmission distance is extended from 25 km to 50 km.

Furthermore, comparing the 25-Gbit/s SP-PAM4 signal Pc1 and the 50-Gbit/s DP-PAM4 signal Pb1 in FIG. 8A, it is understood that the deterioration in the transmission characteristics is kept to a minimum even at the same optical input level.

Considering the fact that a 50-Gbit/s SP-PAM16 signal (not shown) with the same baud rate theoretically requires an optical input level of about 12 dB or more compared with that for the SP-PAM4 signal Pc1, it is understood that the transmission characteristics of the DP-PAM4 signal PH according to the invention is superior to that of the SP-PAM16 signal. In other words, the DP-PAM4 signal Pb1 has less degradation than the SP-PAM16 signal.

Advantageous Effect of the Embodiment

As described above, according to the present embodiment, an optical transmission system 10 having optical transmitters 20a to 20n and optical receivers 60a to 60n connected via an optical fiber transmission line 40 has the following features. The optical transmission system 10 has: a plurality of optical transmitters 20a to 20n that output DP-OOK signals Pa to Pn as orthogonal polarization multiplexed optical signals; and an optical multiplexer 30 that multiplexes the DP-OOK signals Pa to Pn outputted from the plurality of optical transmitters 20a to 20n by wavelength-multiplexing and outputs the wavelength-multiplexed signal ml to an optical fiber transmission line 40. The optical transmission system 10 further has: an optical demultiplexer 50 that demultiplexes the wavelength-multiplexed signal ml into the DP-OOK signals Pa to Pn, which are optical signals of respective wavelengths, via the optical fiber transmission line 40; and optical receivers 60a to 60n that receive the DP-OOK signals Pa to Pn demultiplexed by the optical demultiplexer 50.

(1) An optical transmitter (for example, 20a) of the optical transmission system 10 includes TLSs 21a and 21b serving as light sources, OMs 22a and 22b serving as optical modulators, and a PBS 23 serving as a polarizer.

The TLSs 21a and 21b respectively emit a carrier c1 of the channel Ch1 and a carrier c2 of the channel Ch2. The carriers c1 and c2 respectively have peak frequency components P1 and P2 (FIG. 2) whose frequencies are spaced apart from each other by a predetermined frequency difference and located such that a central frequency of a WDM channel falls between the frequencies of the peak frequency components P1 and P2. The OM 22a outputs an OOK signal s1 of the channel Ch1, which is obtained by modulating the carrier c1 of the channel Ch1 with binary bit sequence data D1; and the OM 22b outputs an OOK signal s2 of the channel Ch2, which is obtained by modulating the carrier c2 of the channel Ch2 with binary bit sequence data D2. The PBS 23 multiplexes the OOK signal s1 of the channel Ch1 and the OOK signal s2 of the channel Ch2 by orthogonal polarization multiplexing, and outputs a resulted DP-OOK signal Pa.

An optical receiver (for example, 60a) includes an IL 61, which is an interleaver, PDs 62a and 62b, ADCs 63a and 63b, and a DSP 64.

The IL 61 transmits and separates the orthogonal polarization multiplexed DP-OOK signal Pa into signals in which signals of the channels Ch1 and Ch2 are combined with different combination ratios, by means of filters whose optical transmittances intersect at the WDM channel and each have a free spectral range equal to or twice the channel spacing of the WDM grid and whose outputs are asymmetric. The PDs 62a and 62b detect the transmitted signal it of the channel Ch1 and the transmitted signal i2 of the channel Ch2, which have been separated from each other, and convert them into an electrical signal e1 of the channel Ch1 and an electrical signal e2 of the channel Ch2. The ADCs 63a and 63b convert the electrical signal e1 of the channel Ch1 and the electrical signal e2 of the channel Ch2 into reception data x1 of the channel Ch1 and reception data x2 of the channel Ch2, which are digital signals. The DSP 64 restores a direct detection signals I1 of the OOK signal s1 and a direct detection signals I2 of the OOK signal s2 on the transmission side from the reception data x1 of the channel Ch1 and the reception data x2 of the channel Ch2. Data D1 and D2 are obtained from the direct detection signals I1 and I2.

According to this configuration, when the orthogonal polarization multiplexed DP-OOK signal Pa in the wavelength-multiplexed signal sent from an optical transmitter (for example, 20a) and transmitted through the optical fiber transmission line 40 is received by an optical receiver (for example, 60a), the peak frequency component P1 of the carrier c1 of the channel Ch1 and the peak frequency component P2 of the carrier c2 of the channel Ch2 are spaced apart from each other by a predetermined frequency difference and located such that the central frequency of the corresponding WDM channel falls between the peak frequency components P1 and P2. Therefore, it is possible to restore the direct detection signal I1 of the OOK signal s1 and the direct detection signal I2 of the OOK signal s2, which have been generated by modulating the carriers c1 and c2 with binary bit sequence data D1 and D2, respectively. The acceptable loss value of the optical fiber transmission line 40 for the direct detection signals I1 and I2 is larger than that for multi-level pulse-amplitude-modulation signals such as a PAM4 signal. For this reason, the length of the optical fiber transmission line 40 can be increased accordingly.

Moreover, as the OOK signals s1 and s2 can be generated by the OMs 22a and 22b having a small and simple structure, which modulate the carriers c1 and c2 with binary bit sequence data D1 and D2, the optical transmitter 20a employing the OMs 22a and 22b can be reduced in size. Moreover, the OOK signals s1 and s2 can be easily restored on the reception side, and the arithmetic circuit of the DSP 64 that performs the restoration can be reduced in size and simplified. Thus, the optical receiver 60a employing the DSP 64 can be reduced in size. Therefore, it is possible to realize long distance transmission with a small-sized optical module performing optical communication using the optical transmitter 20a and a small-sized optical module performing optical communication using the optical receiver 60a.

The optical transmitter 20a modulates the carrier c1 of the channel Ch1 and the carrier c2 of the channel Ch2 with data D1 and D2 by using two OMs, i.e., 22a and 22b, and the optical receiver 60a detects them by using two PDs, i.e., 62a and 62b. As the PDs 62a and 62b detect binary levels fast, the optical receiver 60a has good reception sensitivity. With good reception sensitivity, the transmission capacity can be increased without shortening the length of the optical fiber transmission line 40.

Modification of Embodiment

In the optical transmission system 10 of the embodiment shown in FIG. 1, in each of the optical receivers 60a to 60n, the OM 22a modulates the carrier c1 of the channel Ch1 with data D1 to output the OOK signal s1 of the channel Ch1 and the OM 22b modulates the carrier c2 of the channel Ch2 with data D2 to output the OOK signal s2 of the channel Ch2.

In a modified example, a PAM4 signal (4-level pulse-amplitude-modulation signal) of Ch1 and a PAM4 signal of Ch2 are output instead of the OOK signal s1 of Ch1 and the OOK signal s2 of Ch2.

Here, PAM4 means 4-level pulse-amplitude modulation, and is a method of modulating an optical carrier with 4-level (voltage level) pulse signal, which is constructed by converting a bit sequence of 0s and 1s by mapping "00" to a voltage L1, "01" to a voltage L2, "10" to a voltage L3, and "11" to a voltage L4.

In this case, the OM 22a is configured to output a PAM4 signal of the channel Ch1 by modulating the carrier c1 of the channel Ch1 with a 4-level pulse signal, and the OM 22b is configured to output a PAM4 signal of the channel Ch2 by modulating the carrier c2 of the channel Ch2 with a 4-level pulse signal. In this case, the PBS 23 multiplexes the PAM4 signal of the channel Ch1 and the PAM4 signal of the channel Ch 2 by orthogonal-polarization multiplexing and outputs the result to the optical multiplexer 30.

In each of the optical receivers 60a to 60n, the IL 61 separates the PAM4 signals of the channels Ch1 and Ch2, which have been multiplexed by orthogonal polarization multiplexing, into signals i1 and i2 and transmits the signals i1 and i2 to the PDs 62a 62b. The PD 62a convers the transmitted signal i1, in which the PAM4 signals of the channels Ch1 and Ch2 have been orthogonal polarization multiplexed, into the electrical signal e1 by direct detection; and the PD 62b convers the transmitted signal i2, in which the PAM4 signals of the channels Ch1 and Ch2 have been orthogonal polarization multiplexed, into the electrical signal e2 by direct detection. The ADC 63a converts the electrical signal e1, which is an analog signals, into the digital reception data x1 and outputs it to the DSP 64; and the ADC 63b converts the electrical signal e2, which is an analog signals, into the digital reception data x2 and outputs it to the DSP 64.

That is, the transmitted signal i1, in which the PAM4 signals of the channels Ch1 and Ch2 are orthogonal polarization multiplexed, is directly detected by PD 62a and then converted into a digital signal by ADC 63a; and the transmitted signal i2, in which the PAM4 signals of Ch1 and Ch2 are orthogonal polarization multiplexed, is directly detected by PD 62b and then converted into a digital signal by ADC 63b. This processing produces two reception data x1 and x2, in which the PAM4 signals, which are respective intensity signals of the channels Ch1 and Ch2, are combined at different combination ratios.

The DSP 64 performs an arithmetic processing to restore the PAM4 signal in which the carrier c1 of the channel Ch1 is modulated with a 4-level pulse signal on the transmitting side and restore the PAM4 signal in which the carrier c2 of Ch2 is modulated with a 4-level pulse signal on the transmitting side, from the two reception signals x1 and x2, and obtain 4-level pulse signals from the restored PAM4 signals.

The acceptable loss value of the optical fiber transmission line 40 for a polarization-multiplexed $PAM2^M$ signal ($2^M$-level pulse-amplitude-modulation signal) (M is a positive integer of 2 or more) is larger than that for signals like $2^{2M}$-level pulse-amplitude-modulation signal with the same transmission capacity. Therefore, the length of the optical fiber transmission line 40 can be increased accordingly. Therefore, long distance transmission can be realized.

Other than the above, various modifications can be made as appropriate without departing from the scope of the present invention.

REFERENCE SIGNS LIST 10, 10A optical transmission system
11 transmitter optical module
12 receiver optical module
20a to 20n optical transmitters
21 TLS
21a, 21b TLS (light source)
22a, 22b OM (optical modulator)
23 PBS (optical polarizer)
30 optical multiplexer
40 optical fiber transmission line
50 optical demultiplexer
60a to 60n optical Receiver
61 IL (interleaver)
62a, 62b PD (photo detector)
63a, 63b ADC (A/D converter)
64 DSP (digital signal processor)

The invention claimed is:

1. An optical transmitter for transmitting an orthogonal polarization multiplexed optical signal to an optical receiver via an optical fiber transmission line, the optical transmitter comprising:

two light sources that respectively emit two optical carriers respectively having peak frequency components whose frequencies are spaced apart from each other by a predetermined frequency difference and located such that a central frequency of a predetermined wavelength division multiplexing (WDM) channel falls between the frequencies of the peak frequency components;

two optical modulators that respectively generate two modulated signals by modulating the two optical carriers respectively with two binary bit sequences by on-off keying or $2^M$-level pulse amplitude modulation, where M is a positive integer of 2 or more, wherein a normalized frequency spacing, defined by the predetermined frequency difference divided by a baud rate of each of the two modulated signals, is greater than or equal to 0.4 and less than 1; and an optical polarizer that generates the orthogonal polarization multiplexed optical signal by multiplexing the two modulated signals by orthogonal polarization multiplexing.

2. An optical receiver for receiving an orthogonal polarization multiplexed optical signal via an optical fiber transmission line, the orthogonal polarization multiplexed optical signal generated on a transmission side by generating two modulated signals by modulating two optical carriers respectively with two binary bit sequences by on-off keying or $2^M$-level pulse amplitude modulation, where M is a positive integer of 2 or more, and multiplexing the two modulated signals by orthogonal polarization multiplexing, the two optical carriers respectively having peak frequency components whose frequencies are spaced apart from each other by a predetermined frequency difference and located such that a central frequency of a predetermined wavelength division multiplexing (WDM) channel of a WDM grid falls between the frequencies of the peak frequency components, the optical receiver comprising:
an interleaver that transmits and separates the orthogonal polarization multiplexed optical signal into two signals in which optical signal components of the two modulated signals multiplexed in the orthogonal polarization multiplexed optical signal are combined with different combination ratios, by means of a 1-input, 2-output asymmetric filter whose two optical transmittances intersect at the predetermined WDM grid channel and each have a free spectral range equal to or twice a channel spacing of the WDM grid and whose outputs are asymmetric;
two detectors that respectively detect the two separated signals and respectively convert the two detected signals into two electrical signals; two A/D converters that respectively convert the two electrical signals converted by the detectors into two digital signals; and
a digital signal processor that restores the two modulated signals generated on the transmission side from the two digital signals converted by the A/D converters.

3. An optical transmission system, comprising:
a plurality of optical transmitters including a first optical transmitter that outputs an orthogonal polarization multiplexed optical signal;
an optical multiplexer for wavelength-multiplexing optical signals outputted from the plurality of optical transmitters to output a wavelength-multiplexed signal, the optical signals including the orthogonal polarization multiplexed optical signal;
an optical fiber transmission line through which the wavelength-multiplexed signal is transmitted;
an optical demultiplexer for demultiplexing the wavelength-multiplexed signal having been transmitted through the optical fiber transmission line into optical signals of respective wavelengths, and
an optical receiver for receiving one of the optical signals demultiplexed by the optical demultiplexer, the one of the optical signals corresponding to the orthogonal polarization multiplexed optical signal,
wherein the first optical transmitter generates two modulated optical signals by modulating two optical carriers respectively with two binary bit sequences by on-off keying or $2^M$-level pulse amplitude modulation, where M is a positive integer of 2 or more, and generates and outputs the orthogonal polarization multiplexed optical signal by multiplexing the two modulated optical signals by orthogonal polarization multiplexing,
wherein the two optical carriers respectively have peak frequency components whose frequencies are spaced apart from each other by a predetermined frequency difference and located such that a central frequency of a predetermined wavelength division multiplexing (WDM) channel of a WDM grid falls between the frequencies of the peak frequency components, and
wherein the optical receiver:
separates the orthogonal polarization multiplexed optical signal into two signals in which optical signal components of the two modulated optical signals multiplexed in the orthogonal polarization multiplexed optical signal are combined with different combination ratios, by means of a 1-input, 2-output asymmetric filter whose two optical transmittances intersect at the predetermined WDM channel and each have a free spectral range equal to or twice a channel spacing of the WDM grid and whose outputs are asymmetric;
detects and converts the two separated signals respectively into two digital signals; and
restores the two modulated optical signals from the converted two digital signals.

4. The optical transmission system according to claim 3, wherein the optical transmitter comprises:
a first optical modulator for modulating one of the two optical carriers with one of the two binary bit sequences; and
a second optical modulator for modulating the other of the two carriers with the other of the two binary bit sequences,
wherein the optical receiver comprises:
a first photo-detector for detecting one of the two signals separated by the 1-input, 2-output asymmetric filter; and
a second photo-detector for detecting the other of the two signals separated by the 1-input, 2-output asymmetric filter.

\* \* \* \* \*